(12) United States Patent
Borenstein et al.

(10) Patent No.: US 9,844,779 B2
(45) Date of Patent: Dec. 19, 2017

(54) MEMBRANE-INTEGRATED MICROFLUIDIC DEVICE FOR IMAGING CELLS

(75) Inventors: Jeffrey T. Borenstein, Newton, MA (US); Joseph L. Charest, Cambridge, MA (US); Joseph Cuiffi, Albuquerque, NM (US); Alla Epshteyn, Brookline, MA (US); Angela B. Holton, Tampa, FL (US); James Ching-Ming Hsiao, Watertown, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 540 days.

(21) Appl. No.: 13/349,830

(22) Filed: Jan. 13, 2012

(65) Prior Publication Data

US 2012/0182609 A1    Jul. 19, 2012

Related U.S. Application Data (60) Provisional application No. 61/432,781, filed on Jan. 14, 2011.

(51) Int. Cl.
*B01L 3/00* (2006.01)
*C12M 1/12* (2006.01)
*G02B 21/33* (2006.01)

(52) U.S. Cl.
CPC ........ *B01L 3/502707* (2013.01); *G02B 21/33* (2013.01); *B01L 2200/0689* (2013.01);
(Continued)

(58) Field of Classification Search
CPC ........... B01J 2219/00659; B01L 3/502; B01L 3/5025; B01L 3/5027; B01L 3/502707;
(Continued)

(56) References Cited

U.S. PATENT DOCUMENTS

| 6,176,962 B1 * | 1/2001 | Soane ................ B01D 57/02 156/273.5 |
| 2004/0077075 A1 * | 4/2004 | Jensen et al. ............ 435/297.2 |

(Continued)

OTHER PUBLICATIONS

Aran et al., Irreverible, direct bonding of nanoporous polymer membranes to PDMS or glass microdevices, Lab on a Chip, vol. 10, pp. 548-552 (2010).
(Continued)

*Primary Examiner* — Michael Hobbs
(74) *Attorney, Agent, or Firm* — Christopher J. McKenna; Foley & Lardner LLP (57) ABSTRACT

A microfluidic device is provided. The microfluidic device includes a first transparent, solid support layer. A first polymeric layer defining at least one chamber is attached to the first transparent, solid support layer. A semi-permeable membrane is attached to the first polymeric layer. A second polymeric layer is attached to the opposite side of the semi-permeable membrane from the first polymeric layer. The second polymeric layer has a thickness of less than 300 microns and defines at least one chamber positioned to overlap with at least one chamber in the first polymeric layer. A first manifold structure is attached to an input end of at least one chamber and a second manifold structure is attached to an output end of at least one chamber.

29 Claims, 7 Drawing Sheets

(52) U.S. Cl.
CPC ............... *B01L 2300/0816* (2013.01); *B01L 2300/0887* (2013.01)

(58) Field of Classification Search
CPC .... B01L 2300/0822; B01L 2400/0487; C12M 1/20; C12M 1/28; C12M 23/04; C12M 23/02; C12M 23/00; C12M 23/16; C12M 23/22; C12M 23/24; C12M 23/34; C12M 25/02; C12M 25/04; C12M 25/06; C12M 29/04; G01N 33/5008
USPC ......... 435/297.5, 288.2, 288.3, 288.4, 288.5, 435/368, 23, 29, 288.7, 289.1, 287.8; 422/502, 504; 264/293; 210/321.6
See application file for complete search history.

(56) References Cited

U.S. PATENT DOCUMENTS

| | | | |
|---|---|---|---|
| 2005/0087122 A1* | 4/2005 | Ismagliov et al. ................. | 117/2 |
| 2007/0014695 A1* | 1/2007 | Yue ................... | B01L 3/502723 422/400 |
| 2009/0279085 A1* | 11/2009 | Ebstein ............. | B01L 3/502753 356/301 |
| 2009/0318303 A1* | 12/2009 | Delamarche et al. ............ | 506/9 |
| 2010/0240086 A1* | 9/2010 | Kashanin et al. ......... | 435/288.3 |
| 2010/0326914 A1* | 12/2010 | Drost et al. ................... | 210/644 |
| 2011/0294222 A1* | 12/2011 | Delaire ................... | B01F 5/061 436/73 |

OTHER PUBLICATIONS

Brandrup, J. et al., Polymer Handbook, 3rd edition (Wiley, N.Y., 1989), Table of Contents only.

Carraro et al. "In vitro analysis of a hepatic device with intrinsic microvascular-based channels", Biomed Microdevices, 2008, vol. 10, pp. 795-805.

Huh et al. "Microfluidic Pulmonary system for Experimental Investigation of Cellular Injury due to Fluid Mechanical Stresses during Airway Reopening", World Congress on Medical Physics and Biomedical Engineering 2006, 2007, vol. 1, Track 04, pp. 258-262.

Huh et al. "Reconstituting Organ-level Lung Functions on a Chip", Science, Jun. 25, 2010, vol. 328, p. 1662-1668.

Jang, K. et al. "A multi-layer microfluidic device for efficient culture and analysis of renal tubular cells", Lab Chip, 2010, vol. 10, pp. 36-42.

Khademhosseini et al., Microscale tecnologies for tissue engineering and biology, Proc. Natl. Acad. Sci. vol. 103, No. 8, pp. 2480-2487, Feb. 21, 2006.

Lee P, et al. "An Artificial Liver Sinusoid with a Microfluidic Endothelial-Like Barrier for Primary Hepatocyte Culture", Biotechnology and Bioengineering, Aug. 1, 2007, vol. 97, No. 5, pp. 1340-1346.

Ma, S. et al. "An endothelial and astrocyte co-culture model of the blood-brain barrier utilizing an ultra-thin, nanofabricated silicon nitride membrane", 2005, Lab Chip, vol. 5, pp. 74-85.

Shao, J. et al. "A microfluidic chip for permeability assays of endothelial monolayer", Biomed Microdevices, 2010, vol. 12, pp. 81-88.

Wlodkowic, D. et al. "Biological Implications of Polymeric Microdevices for Live Cell Assays", Anal. Chem, 2009, vol. 81, pp. 9828-9833.

Yung, C. et al. "Micromagnetic-microfluidic blood cleansing device", May 7, 2009, vol. 9, No. 9, pp. 1153-1308.

Zanella, F. et al. "High content screening: seeing is believing", Trends in Biotechnology, May 2010, vol. 28, No. 5, pp. 237-245.

Duncanson et al., Functionalized Microfluidic Networks for Evaluation of Vascular Injury, TERMIS—NA 2008 Conference & Expo, San Diego, CA, 2008.

* cited by examiner

MEMBRANE-INTEGRATED MICROFLUIDIC DEVICE FOR IMAGING CELLS

RELATED APPLICATIONS

This application claims the benefit of and priority to U.S. Provisional Patent Application Ser. No. 61/432,781, filed Jan. 14, 2011, the contents of which are hereby incorporated by reference.

FIELD OF THE INVENTION

The invention provides microfluidic devices, methods for imaging cells, and methods for preparing such microfluidic devices.

BACKGROUND

The complexity of tissue structure presents challenges in creating physiologically relevant in vitro models that closely mimic in vivo cell microenvironments. One technique used to model tissue mimetic biological interfaces is membrane inserts (such as Millicell™, Transwell™) that facilitate co-culture of cells on opposite sides of the barrier. However, many physiologically realistic in vitro models require dynamic flow conditions to achieve comparable cell microenvironments.

Microfluidic-based cell culture systems can overcome certain limitations in perfusion, and these systems can be well-suited for multiplexed in vitro models. See, for example, Wu et al. in *Proc. Natl. Acad. Sci. USA*, 2006, 103, 2480. Several microfluidic approaches that utilize either horizontally integrated membrane layers or vertically defined features to create a biological barrier have been described. See, for example, Carraro et al. in *Biomed. Microdevices*, 2008, 10, 795; Duncanson et al. in *TERMIS-NA* 2008 Conference & Expo, San Diego, Calif., 2008; Ma et al. in *Lab Chip*, 2005, 5, 74; Huh et al. in *World Congress on Medical Physics and Biomedical Engineering* 2006, 2007, 258; Huh et al. in *Science*, 2010, 328, 1662; Shao et al. in *Biomed. Microdevices*, 2010, 12, 81; Jang et al. in *Lab Chip*, 2010, 10, 36; Lee et al. in *Biotechnol. Bioeng.*, 2007, 97, 1340; and Zanell et al. in *Trends Biotechnol.*, 2010, 28, 237. Such microfluidic cellular constructs have been seeded with different cell types on opposite sides of the membrane to demonstrate models of an alveolar-capillary interface, smooth muscle cell-endothelial interface, and endothelial cell-astrocytic end feet interface.

Although microfluidic devices reported in the literature can be useful for investigating biological interfaces, their fabrication and assembly presents multiple challenges. These challenges manifest as a trade-off between geometric and mechanical complexity (e.g., integrated membranes, scaffolds, and multilayer formats) and the ability to visualize cells using high-resolution microscopy. Technical advances in high-content screening have enabled the practical implementation of high-throughput sub-cellular, high-resolution imaging, but these data are not available when complex culture systems are optically inaccessible. See, for example, Wlodkowic et al. in *Anal Chem*, 2009, 81, 9828.

Accordingly, the need exists for new microfluidic devices that are amenable for use with imaging equipment and can present cells in an environment that adequately mimics in vivo conditions. The present invention addresses the need for improved microfluidic devices and methods for imaging cells and provides other related advantages.

SUMMARY

The invention provides microfluidic devices, methods for imaging cells, and methods for manufacturing a microfluidic device. The microfluidic devices may be used in various research and diagnostic applications where it is desirable to study live cells in an environment that mimics conditions in which the cell may occur in vivo. For example, microfluidic devices and methods described herein are contemplated to provide particular advantages in studying hepatocyte cells. The devices can be configured so that the cells may be viewed from both the top surface and the bottom surface of the device.

One type of microfluidic device described herein contains a first transparent, solid support layer attached to a first polymeric layer that defines therein at least one chamber. The first polymeric layer is further attached to a semi-permeable membrane that separates the first polymeric layer from a second polymeric layer. The second polymeric layer defines therein at least one chamber that overlaps, at least partially, with at least one chamber in the first polymeric layer. Cells may be attached to the semi-permeable membrane for observation using a microscope. For example, cells may be attached to the semi-permeable membrane and located in a chamber in the first polymeric layer, and such cells may be observed using a microscope positioned over the transparent polymeric support layer and aligned to look through a chamber in the first polymeric layer to observe the cells. Cells attached to the semi-permeable membrane and located in a chamber in the second polymeric layer may be observed using a microscope positioned over the second polymeric layer and in alignment with one or more chambers in the second polymeric layer in order to observe the cells. The microfluidic device may optionally have a second transparent, solid support layer attached to the surface of the second polymeric layer opposite the semi-permeable membrane.

Accordingly, one aspect of the invention provides a microfluidic device, comprising (a) a first transparent, solid support layer; (b) a first polymeric layer that has a thickness of less than 200 µm, defines therein at least one chamber, and is attached to said first transparent, solid support layer; (c) a semi-permeable membrane attached to the first polymeric layer; and (d) a second polymeric layer attached to the opposite side of the semi-permeable membrane from the first polymeric layer; wherein the second polymeric layer has a thickness of less than 300 µm, and defines therein at least one chamber that is positioned to overlap, at least partially, with at least one chamber in the first polymeric layer. The microfluidic device may optionally have a second transparent, solid support layer attached to the surface of the second polymeric layer opposite the semi-permeable membrane.

Another aspect of the invention provides a method of viewing cells. The method comprises (a) providing a microfluidic device described herein containing cells attached to the semi-permeable membrane; (b) positioning a microscope to view cells attached to the semi-permeable membrane; and (c) viewing said cells with said microscope.

Another aspect of the invention provides another method for viewing cells. The method comprises: (a) providing a microfluidic device comprising: (i) a first, transparent, polymeric layer that has a thickness of from about 75 µm to about 350 µm, and defines therein at least one chamber; (ii) a semi-permeable membrane attached to the first, transparent polymeric layer; (iii) a second, transparent polymeric layer attached to the opposite side of the semi-permeable membrane from the first transparent polymeric layer; wherein the second, transparent polymeric layer defines therein at least one chamber that is positioned to overlap, at least partially, with at least one chamber in the first, transparent, polymeric layer; and (iv) at least one cell attached to a surface of the semi-permeable membrane in a chamber in the first, transparent polymeric layer or a surface of the semi-permeable membrane in a chamber in the second, transparent polymeric layer; (b) positioning a microscope to view said cell; and (c) viewing said cell with the microscope.

Another aspect of the invention provides a method of transferring a patterned, thin polymeric layer from a first substrate to a second substrate. The method comprises (a) providing a patterned, thin polymeric layer on a first substrate; (b) providing a transfer-assist substrate having a surface of polyimide polymer treated with oxygen plasma; (c) transferring the patterned, thin polymeric layer of the first substrate to the surface of polyimide polymer treated with oxygen plasma, to form a composite; (d) plasma treating at least the patterned, thin polymeric layer on the composite to form a plasma-treated composite; (e) exposing at least the patterned, thin polymeric layer of the plasma-treated composite to an aminoalkyltrialkoxysilane to form a pre-bond composite; and (f) transferring the patterned, thin polymeric layer of pre-bond composite to a second substrate.

These and other aspects, along with other features and embodiments of the invention herein disclosed herein, will become more apparent through reference to the following description, drawings, and claims. Furthermore, it is to be understood that the aspects, features, and embodiments described herein are not mutually exclusive and can exist in various combinations and permutations.

DETAILED DESCRIPTION

The invention provides microfluidic devices, methods for imaging cells, and methods for manufacturing a microfluidic device. As explained above, the microfluidic devices may be used in various research and diagnostic applications where it is desirable to study live cells in an environment that mimics the conditions in which cells may occur in vivo. The microfluidic devices and methods are contemplated to provide particular advantages for imaging of cells. For example, the thin profile of the microfluidic devices presents the cells in close proximity to imaging equipment. Furthermore, chambers in the microfluidic devices can be used to deliver nutrients to the cells and mimic in vivo conditions. Still further, microfluidic devices are provided that permit cells to be viewed from both the top and bottom surface of the microfluidic device. Various aspects of the invention are set forth below in sections; however, aspects of the invention described in one particular section are not to be limited to any particular section.

I. Microfluidic Devices for Use in Imaging Cells

One type of microfluidic device described herein contains a first transparent, solid support layer attached to a first polymeric layer that defines therein at least one chamber. The first polymeric layer is further attached to a semi-permeable membrane that separates the first polymeric layer from a second polymeric layer. The second polymeric layer defines therein at least one chamber that overlaps, at least partially, with at least one chamber in the first polymeric layer. The first transparent, solid support layer provides structural support for the microfluidic device. Chambers in the first polymeric layer and second polymeric layer can be used to deliver nutrients to the cells and they provide a pathway for viewing cells attached to the semi-permeable membrane.

Accordingly, one aspect of the invention provides a microfluidic device comprising (a) a first transparent, solid support layer; (b) a first polymeric layer that has a thickness of less than 200 µm, defines therein at least one chamber, and is attached to said first transparent, solid support layer; (c) a semi-permeable membrane attached to the first polymeric layer; and (d) a second polymeric layer attached to the opposite side of the semi-permeable membrane from the first polymeric layer; wherein the second polymeric layer has a thickness of less than 300 µm, and defines therein at least one chamber that is positioned to overlap, at least partially, with at least one chamber in the first polymeric layer.

A. General Features of the First Transparent, Solid Support Layer

Features of the first transparent, solid support layer can be adjusted to achieve certain performance characteristics. One function of the first transparent, solid support layer is to provide structural support to the microfluidic device. Accordingly, in certain embodiments, the first transparent, solid support layer has a thickness in the range about 100 µm to about 170 µm. The first transparent, solid support layer may be made of glass, polyester, polycarbonate, polystyrene, poly(dimethylsiloxane), poly(methyl methacrylate), polyethylene, polyethylene terephthalate, polyurethane, polycaprolactone, polylactic acid, polyglycolic acid, poly(lactic-co-glycolic acid), polyglycerol sebacate, polyester amide, polydioxanone, cyclic olefin copolymer, quartz, or a transparent thermoplastic. In certain other embodiments, the first transparent, solid support layer is made of glass.

B. General Features of the First Polymeric Layer

Features of the first polymeric layer can be adjusted to achieve certain performance characteristics. For example, the thickness of the first polymeric layer can be adjusted, such as where the first polymeric layer has a thickness in the range about 10 µm to about 130 µm, about 50 µm to about 130 µm, or about 90 µm to about 130 µm.

The first polymeric layer may be made of a material selected from poly(dimethylsiloxane) (PDMS), poly-glycerol-sebacate (PGS), polylactic acid (PLA), poly-L-lactic acid (PLLA), poly-D-lactic acid (PDLA), polyglycolide, polyglycolic acid (PGA), poly(lactic-co-glycolic acid), polydioxanone, polygluconate, polylactic acid-polyethylene oxide copolymer, modified cellulose, collagen, polyhydroxybutyrate, polyhydroxpriopionic acid, polyphosphoester, poly(alpha-hydroxy acid), polycaprolactone, polycarbonate, polyamide, polyanhydride, polyamino acid, polyorthoester, polyacetal, polycyanoacrylate, polystyrene, poly(methyl methacrylate), polyethylene, polyethylene terephthalate, polyurethane, polyglycerol sebacate, polyester amide, polydioxanone, cyclic olefin copolymer, polyimide, a degradable urethane polymer, an aliphatic polyester polyacrylate, polymethacrylate, acyl-substituted cellulose acetate, a non-degradable polyurethane, polystyrene, polyvinyl chloride, polyvinyl fluoride, polyvinyl imidazole, chlorosulphonated polyolefin, polyethylene oxide, polyvinyl alcohol, Teflon, nylon silicon, a shape memory material (such as poly(styrene-block-butadiene), polynorbornene, a hydrogel, a metallic alloy, and oligo(E-caprolactone)diol as switching segment/oligo(p-dioxyanone)diol as physical crosslink), and combinations thereof. Other polymers contemplated to be amenable for use are described in The Polymer Handbook, 3rd edition (Wiley, N.Y., 1989).

In certain embodiments, the first polymeric layer is made of poly(dimethylsiloxane), polycarbonate, polystyrene, poly(methyl methacrylate), polyethylene, polyethylene terephthalate, polyurethane, polycaprolactone, polylactic acid, polyglycolic acid, poly(lactic-co-glycolic acid), polyglycerol sebacate, polyester amide, polydioxanone, cyclic olefin copolymer, polyimide, or polyamide. In certain other embodiments, the first polymeric layer is made of poly(dimethylsiloxane).

The number of chambers in the first polymeric layer may be adjusted to provide a microfluidic device tailored for a particular use. For example, in certain embodiments, the first polymeric layer contains a single chamber. In certain other embodiments, the first polymeric layer contains two chambers. In certain embodiments, the first polymeric layer contains the same number of chambers as the second polymeric layer.

Because in certain embodiments it may be desirable for gas (e.g., oxygen gas) to be able to penetrate through the first polymeric layer, the thickness of the first polymeric layer can be selected to achieve particular levels of oxygen gas permeance. Accordingly, in certain embodiments, the thickness of the first polymeric layer is no greater than that which has an oxygen gas permeance of at least $1\times10^{-6}$ mL/s/cm$^2$/cm Hg, $1\times10^{-5}$ mL/s/cm$^2$/cm Hg, $3\times10^{-5}$ mL/s/cm$^2$/cm Hg, $7\times10^{-5}$ mL/s/cm$^2$/cm Hg, or $1\times10^{-4}$ mL/s/cm$^2$/cm Hg. In certain embodiments, the thickness of the first polymeric layer is such that the thickness provides oxygen gas permeance in the range of about $1\times10^{-6}$ mL/s/cm$^2$/cm Hg to about $1\times10^{-3}$ mL/s/cm$^2$/cm Hg, or about $1\times10^{-5}$ mL/s/cm$^2$/cm Hg to about $7\times10^{-5}$ mL/s/cm$^2$/cm Hg.

C. General Features of the Semi-Permeable Membrane

Features of the semi-permeable membrane can be adjusted to achieve certain performance characteristics. For example, the thickness of the semi-permeable membrane can be adjusted, such as where the semi-permeable membrane has a thickness of about 1 µm to about 20 µm, or about 5 µm to about 15 µm. The semi-permeable membrane may be made of a material selected from poly(dimethylsiloxane) (PDMS), poly-glycerol-sebacate (PGS), polylactic acid (PLA), poly-L-lactic acid (PLLA), poly-D-lactic acid (PDLA), polyglycolide, polyglycolic acid (PGA), poly(lactic-co-glycolic acid), polydioxanone, polygluconate, polylactic acid-polyethylene oxide copolymer, modified cellulose, collagen, polyhydroxybutyrate, polyhydroxpriopionic acid, polyphosphoester, poly(alpha-hydroxy acid), polycaprolactone, polycarbonate, polyamide, polyanhydride, polyamino acid, polyorthoester, polyacetal, polycyanoacrylate, polystyrene, poly(methyl methacrylate), polyethylene, polyethylene terephthalate, polyurethane, polyglycerol sebacate, polyester amide, polydioxanone, cyclic olefin copolymer, polyimide, a degradable urethane polymer, an aliphatic polyester polyacrylate, polymethacrylate, acyl-substituted cellulose acetate, a non-degradable polyurethane, polystyrene, polyvinyl chloride, polyvinyl fluoride, polyvinyl imidazole, chlorosulphonated polyolefin, polyethylene oxide, polyvinyl alcohol, Teflon, nylon silicon, a shape memory material (such as poly(styrene-block-butadiene), polynorbornene, a hydrogel, a metallic alloy, and oligo(E-caprolactone)diol as switching segment/oligo(p-dioxyanone)diol as physical crosslink), and combinations thereof. Other polymers contemplated to be amenable for use are described in The Polymer Handbook, 3rd edition (Wiley, N.Y., 1989).

In certain embodiments, the semi-permeable membrane is made of polycarbonate, poly(dimethylsiloxane), polyethersulfone, polysulfone, polystryrene, or polyester. In certain other embodiments, the semi-permeable membrane is made of polycarbonate or poly(dimethylsiloxane). In certain other embodiments, the semi-permeable membrane is made of polycarbonate.

D. General Features of the Second Polymeric Layer

Features of the second polymeric layer can be adjusted to achieve certain performance characteristics. For example, the thickness of the second polymeric layer can be adjusted, such as where the second polymeric layer has a thickness in the range of about 100 µm to about 500 µm, or about 150 µm to about 250 µm. The second polymeric layer may be made of a material selected from poly(dimethylsiloxane) (PDMS), poly-glycerol-sebacate (PGS), polylactic acid (PLA), poly-L-lactic acid (PLLA), poly-D-lactic acid (PDLA), polyglycolide, polyglycolic acid (PGA), poly(lactic-co-glycolic acid), polydioxanone, polygluconate, polylactic acid-polyethylene oxide copolymer, modified cellulose, collagen, polyhydroxybutyrate, polyhydroxpriopionic acid, polyphosphoester, poly(alpha-hydroxy acid), polycaprolactone, polycarbonate, polyamide, polyanhydride, polyamino acid, polyorthoester, polyacetal, polycyanoacrylate, polystyrene, poly(methyl methacrylate), polyethylene, polyethylene terephthalate, polyurethane, polyglycerol sebacate, polyester amide, polydioxanone, cyclic olefin copolymer, polyimide, a degradable urethane polymer, an aliphatic polyester polyacrylate, polymethacrylate, acyl-substituted cellulose acetate, a non-degradable polyurethane, polystyrene, polyvinyl chloride, polyvinyl fluoride, polyvinyl imidazole, chlorosulphonated polyolefin, polyethylene oxide, polyvinyl alcohol, Teflon, nylon silicon, a shape memory material (such as poly(styrene-block-butadiene), polynorbornene, a hydrogel, a metallic alloy, and oligo(E-caprolactone)diol as switching segment/oligo(p-dioxyanone)diol as physical crosslink), and combinations thereof. Other polymers contemplated to be amenable for use are described in The Polymer Handbook, 3rd edition (Wiley, N.Y., 1989).

In certain embodiments, the second polymeric layer is made of poly(dimethylsiloxane), polycarbonate, polystyrene, poly(methyl methacrylate), polyethylene, polyethylene terephthalate, polyurethane, polycaprolactone, polylactic acid, polyglycolic acid, poly(lactic-co-glycolic acid), polyglycerol sebacate, polyester amide, polydioxanone, cyclic olefin copolymer, polyimide, or polyamide. In certain other embodiments, the second polymeric layer is made of poly(dimethylsiloxane).

The number of chambers in the second polymeric layer may be adjusted to provide a microfluidic device tailored for a particular use. For example, in certain embodiments, the second polymeric layer contains a single chamber. In certain other embodiments, the second polymeric layer contains two chambers. In certain embodiments, the second polymeric layer contains the same number of chambers as the first polymeric layer.

Because in certain embodiments it may desirable for gas (e.g., oxygen gas) to be able to penetrate through the second polymeric layer, the thickness of the second polymeric layer can be selected to achieve particular levels of oxygen gas permeance. Accordingly, in certain embodiments, the thickness of the second polymeric layer is no greater than that which has an oxygen gas permeance of at least $1\times10^{-6}$ mL/s/cm$^2$/cm Hg, $1\times10^{-5}$ mL/s/cm$^2$/cm Hg, $3\times10^{-5}$ mL/s/cm$^2$/cm Hg, $7\times10^{-5}$ mL/s/cm$^2$/cm Hg, or $1\times10^{-4}$ mL/s/cm$^2$/cm Hg. In certain embodiments, the thickness of the second polymeric layer is such that the thickness provides oxygen gas permeance in the range of about $1\times10^{-6}$ mL/s/cm$^2$/cm Hg to about $1\times10^{-3}$ mL/s/cm$^2$/cm Hg, or about $1\times10^{-5}$ mL/s/cm$^2$/cm Hg to about $7\times10^{-5}$ mL/s/cm$^2$/cm Hg.

E. General Features of the Optional Second Transparent, Solid Support Layer

The microfluidic device may optionally have a second transparent, solid support layer attached to the surface of the second polymeric layer opposite the semi-permeable membrane. Features of the second transparent, solid support layer can be adjusted to achieve certain performance characteristics. The second transparent, solid support layer is contemplated to provide further structural support to the microfluidic device. Accordingly, in certain embodiments, the second transparent, solid support layer has a thickness in the range about 100 µm to about 170 µm. The second transparent, solid support layer may be made of glass, polyester, polycarbonate, polystyrene, poly(dimethylsiloxane), poly(methyl methacrylate), polyethylene, polyethylene terephthalate, polyurethane, polycaprolactone, polylactic acid, polyglycolic acid, poly(lactic-co-glycolic acid), polyglycerol sebacate, polyester amide, polydioxanone, cyclic olefin copolymer, quartz, or a transparent thermoplastic. In certain other embodiments, the first transparent, solid support layer is made of glass.

Figure 6:
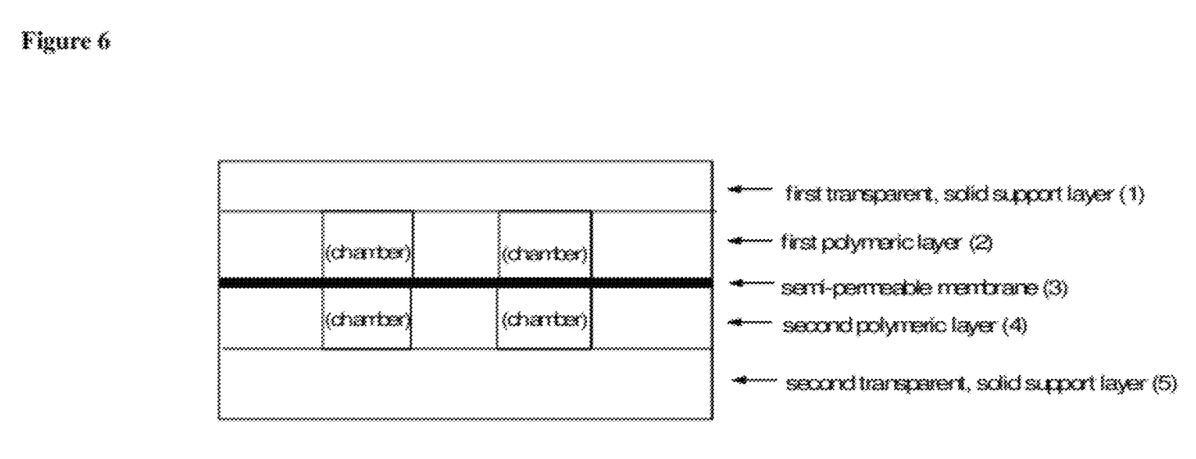
FIG. 6 is an illustration of a cross-sectional view an exemplary microfluidic device that has a first transparent, solid support layer (1) attached to a first polymeric layer (2), which is attached to a semi-permeable membrane (3) which is attached to a second polymeric layer (4), which is attached to a second, transparent solid support layer (5).

In embodiments where the microfluidic device comprises a second transparent, solid support layer, the second polymeric layer desirably has one or more of the following features: (1) a thickness in the range about 10 µm to about 130 µm, and (2) any chamber in the second polymeric layer has a height spanning from the semi-permeable membrane to the second transparent, solid support layer. FIG. 6 illustrates a cross-sectional view a microfluidic device that has a first transparent, solid support layer (1) attached to a first polymeric layer (2), which is attached to a semi-permeable membrane (3) which is attached to a second polymeric layer (4), which is attached to a second, transparent solid support layer (5).

F. Inclusion of Cells in a Chamber in the First and/or Second Polymeric Layer

The microfluidic device may further comprise one or more cells attached to a surface of the semi-permeable membrane in a chamber in the first polymeric layer. In certain embodiments, the microfluidic device may further comprise one or more cells attached to a surface of the semi-permeable membrane in a chamber in the second polymeric layer.

G. Exemplary Dimensions of the Microfluidic Device

Microfluidic devices having a thin profile are contemplated to provide certain advantages for use with a microscope to view cells. Layers in the device contribute to the thickness of the microfluidic device. Accordingly, in certain embodiments, the thickness of layers (e.g., the first transparent, solid support layer; the first polymeric layer; the second polymeric layer; and any second transparent, solid support layer) in the microfluidic device are desirably selected so that the distance between the semi-permeable membrane and the top or bottom surface of the device does not exceed the working distance of a microscope used with the microfluidic device. In certain embodiments, the distance between the semi-permeable membrane and the outer surface of the first transparent, solid support layer is less than 300 µm or 250 µm. In certain embodiments, the distance between the semi-permeable membrane and the outer surface of the second polymeric layer is less than 300 µm or 250 µm. In certain other embodiments, the distance between the semi-permeable membrane and the outer surface of the second transparent, solid support layer is less than 300 µm or 250 µm.

H. Optional Solid Frame for Microfluidic Device

Figure 5:
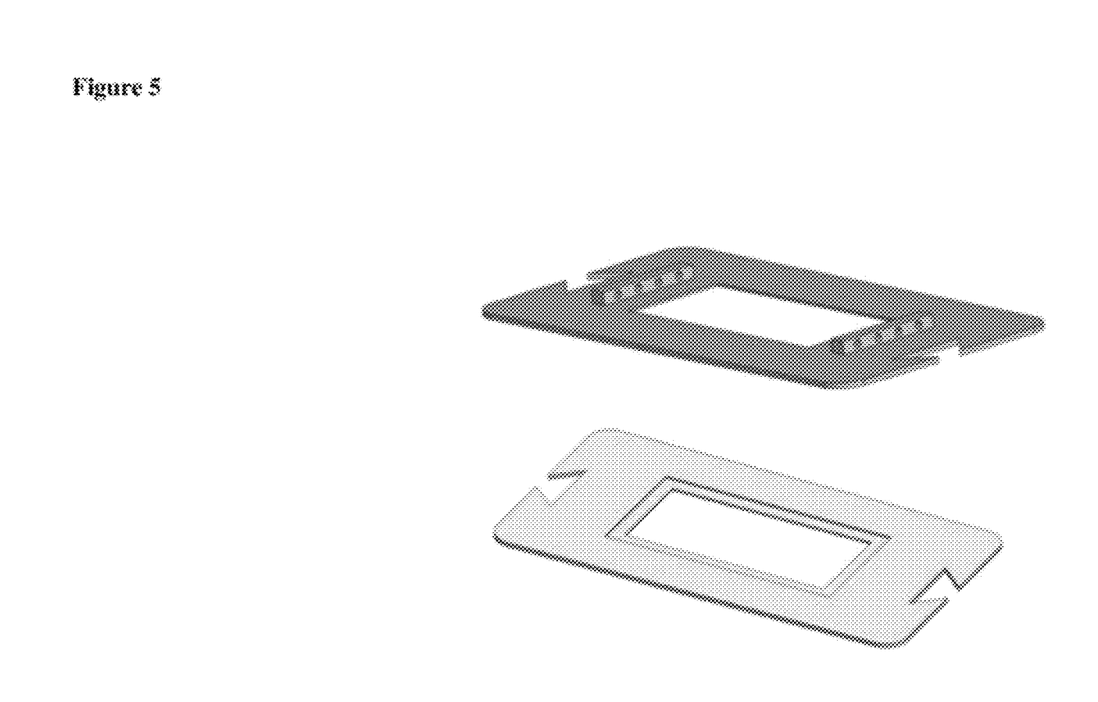
FIG. 5 is an illustration of components that may be combined to form an exemplary frame contemplated for use with microfluidic devices described herein.

In embodiments where it is desirable to increase the structural rigidity of the microfluidic device, the composite formed by (1) the first transparent, solid support layer, (2) the first polymeric layer, (3) the semi-permeable membrane, (4) the second polymeric layer, and optionally (5) the second transparent, solid support layer, can be placed into a solid frame. In certain embodiments, the solid frame surrounds the edges of the microfluidic device, thereby leaving the upper surface and lower surface of the microfluidic device clear for viewing using a microscope. In certain embodiments, the solid frame may be made of metal (such as steel) or a rigid plastic. FIG. 5 is an illustration of components that may be combined to form an exemplary frame contemplated for use with microfluidic devices described herein.

II. Chamber Features

Chamber features can be characterized according their physical dimensions, topographic features, and presence of modifications to the surface of the chamber. Various aspects of the chamber features are described below.

A. Height, Width, and Length of Chambers

Chambers can be characterized according to the height, width, and/or length of the chambers. The particular combination of height, width, and length of the chambers can impact the surface area of the chamber, flow properties of fluid passing through a chamber, and pressure that may be required in order to drive fluid through the chamber.

Regarding the height of any chamber in the first polymeric layer, in certain embodiments, said chambers have a height spanning from the first transparent, solid support layer to the semi-permeable membrane.

Regarding the width of any chamber in the first polymeric layer, in certain embodiments, said chambers have a width in the range of from about 10 µm to about 1 cm. In certain other embodiments, any chamber in the first polymer layer has a width in the range of from about 1 µm to about 1 cm, from about 50 µm to about 700 µm, about 50 µm to about 500 µm, about 50 µm to about 400 µm, about 100 µm to about 500 µm, about 200 µm to about 400 µm, or from about 250 µm to about 350 µm. In certain other embodiments, any chamber in the first polymer layer has a width in the range of from about 100 µm to about 500 µm.

Regarding the height of any chamber in the second polymeric layer, in certain embodiments, said chambers have a height in the range of from about 10 µm to about 150 µm, 50 µm to about 150 µm, 100 µm to about 150 µm, 10 µm to about 100 µm, or 10 µm to about 50 µm. In embodiments where the microfluidic device comprises a second, transparent support layer attached to the surface of the second polymeric layer opposite the semi-permeable membrane, the height of any chamber in the second polymeric layer may span from the semi-permeable membrane to the second transparent, solid support layer.

Regarding the width of any chamber in the second polymeric layer, in certain embodiments, said chambers have a width in the range of from about 10 µm to about 1 cm. In certain other embodiments, any chamber in the second polymer layer has a width in the range of about 1 µm to about 1 cm, from about 50 µm to about 700 µm, about 50 µm to about 500 µm, about 50 µm to about 400 µm, about 100 µm to about 500 µm, about 200 µm to about 400 µm, or about 250 µm to about 350 µm. In certain other embodiments, any chamber in the second polymeric layer has a width in the range of from about 100 µm to about 500 µm.

Regarding the length of a chamber, in certain embodiments, any chamber has a length less than 2 cm, 5 cm, 7 cm, 10 cm, or 15 cm. In certain embodiments, any chamber has a length in a range of about 2 cm to about 15 cm, about 2 to about 10 cm, about 4 cm to about 8 cm, or about 5 cm to about 10 cm.

B. Cross-Sectional Characterization of Chambers

It is contemplated that chambers with various types of cross-sections are amenable for use in the microfluidic devices described herein. For example, in certain instances, the chambers may be rectangular, round, triangular, semi-circular, or other geometries. It is contemplated that certain cross-section geometries described herein can minimize shear stress experienced by fluid, e.g., traveling through fluid chamber(s) in the device. For example, it is completed that rounded or semi-circular cross sectional geometries can minimize shear stress experienced by a fluid traveling through the chamber(s), and enhance the surface-to-volume ratio of the chamber.

Further, the cross-sectional geometry of a fluid chamber can be selected in order to minimize the pressure that must be exerted on the fluid, e.g., nutrients for the cells, in order to force the fluid through the microfluidic device. Cross-sectional geometries that promote fluid transfer through the chamber with minimal friction with the walls of the chamber are contemplated to minimize the pressure that must be exerted on the fluid in order to force the fluid through the microfluidic device. In addition, cross-sectional geometries that promote fluid transfer by minimizing loses associated with layers of fluid moving through the chambers are contemplated to minimize the pressure that must be exerted on the fluid in order to force the fluid through the microfluidic device.

C. Topographic Features of Chambers

Chambers may contain three-dimensional structures to, for example, induce fluid mixing, or to achieve other particular performance properties. Structures that induce fluid mixing can include topographic features directing fluid out of line with the flow direction (such as cross-hatched patterns or ridges placed diagonal to the flow), flexible elements that deform under the flow to create temporal perturbations in the fluid, and elements that induce rotational flows within the flow stream. Accordingly, in certain embodiments, a chamber further comprises a mixing element to induce fluid mixing. In certain other embodiments, a chamber comprises one or more changes in height or width of the chamber along the longitudinal axis of the chamber.

Another feature of the chambers relates to two-dimensional structures, such as, networks of branched or bifurcated channels. The networks may feature smooth bifurcations and/or gradual changes in the cross-sectional channel dimensions, and may mimic the physiological properties of in-vivo vascular and/or micro-vascular networks.

D. Modifications to the Surface of Chambers

The inner surface of chambers can be modified to achieve certain performance properties, such as improved resistance to degradation caused by a particular substance that may be present in the fluid. In certain embodiments, the inner surface of a chamber may be modified with an agent that alters the hydrophilicity of the chamber surface. Such agents may include a hydrophobic agent or a hydrophilic agent. In certain embodiments, the surface of a chamber is modified to include collagen. Attaching an agent (e.g., fibrin and/or fibronectin) that facilitates cellular adhesion and provides a matrix for supporting cells can provide certain advantages for supporting cells in the microfluidic device. In embodiments where the microfluidic device is used in the detection of an analyte, attachment of an antibody to the surface of a chamber may provide certain advantages, such as aiding detection of an analyte.

It is appreciated that the surface modification may be a partial coating of the inner wall of the chamber with a particular substance or a complete coating of the inner wall of the chamber with a particular substance. The extent of coating may be adjusted in order to achieve a particular performance property for a desired application.

III. Distribution System for Delivering Fluid to the Microfluidic Device

The microfluidic device may comprise a distribution system for delivering a fluid to any chamber in the device. The distribution system may comprise branching or bifurcating microchannels, biomimetic vascular-like channels, or a manifold structure. The manifold structure may connect a single chamber to a single tube delivering fluid to the microfluidic device, or the manifold structure may connect multiple chambers in the microfluidic device to a single tube delivering fluid to the microfluidic device. In certain embodiments, the microfluidic device contains a single chamber in the first polymeric layer, and the manifold connects the single chamber in the first polymeric layer to a single tube delivering fluid to the microfluidic device.

In certain other embodiments, a microfluidic device described herein further comprises a distribution system fluidly connected to any chamber in the first polymeric layer and fluidly connected to any chamber in the second polymeric layer. In certain embodiments, the distribution system comprises branching or bifurcating microchannels, biomimetic vascular-like channels, or a manifold structure.

In certain other embodiments, the distribution system comprises a first manifold structure attached to the input end of any chambers, and a second manifold structure attached to the output end of any chambers. The first manifold structure and second manifold structure may be located on the same side of the microfluidic device. The height and shape of the first manifold structure and second manifold structure desirably permit an objective lens of a microscope to come into close proximity to the top surface and bottom surface of the microfluidic device. Furthermore, the microfluidic device is desirably constructed so that the distance between the first manifold structure and second manifold structure is sufficient to permit an objective lens of a microscope to come into close proximity to either surface of the microfluidic device.

Various combinations of height and shape of the first manifold structure and second manifold are contemplated to be amenable for use in the present invention. For example, in certain embodiments, the first manifold structure and the second manifold structure have a height in the range of about 0.5 mm to about 5 mm. In certain embodiments, the first manifold structure and the second manifold structure have a height in the range of about 1 mm to 3 mm. The shape of the first manifold structure and the second manifold structure may be selected as appropriate, such as rectangular, curved, slanted, or beveled. Furthermore, the microfluidic device may be further characterized in that the distance between the first manifold structure and second manifold structure is sufficient to permit an objective lens of a microscope to come into close proximity to the same surface of the microfluidic device upon which the first manifold structure and second manifold structure are attached. In certain embodiments, the distance between the first manifold structure and second manifold structure may be greater than 20 mm, 30 mm or 40 mm.

Figure 7:
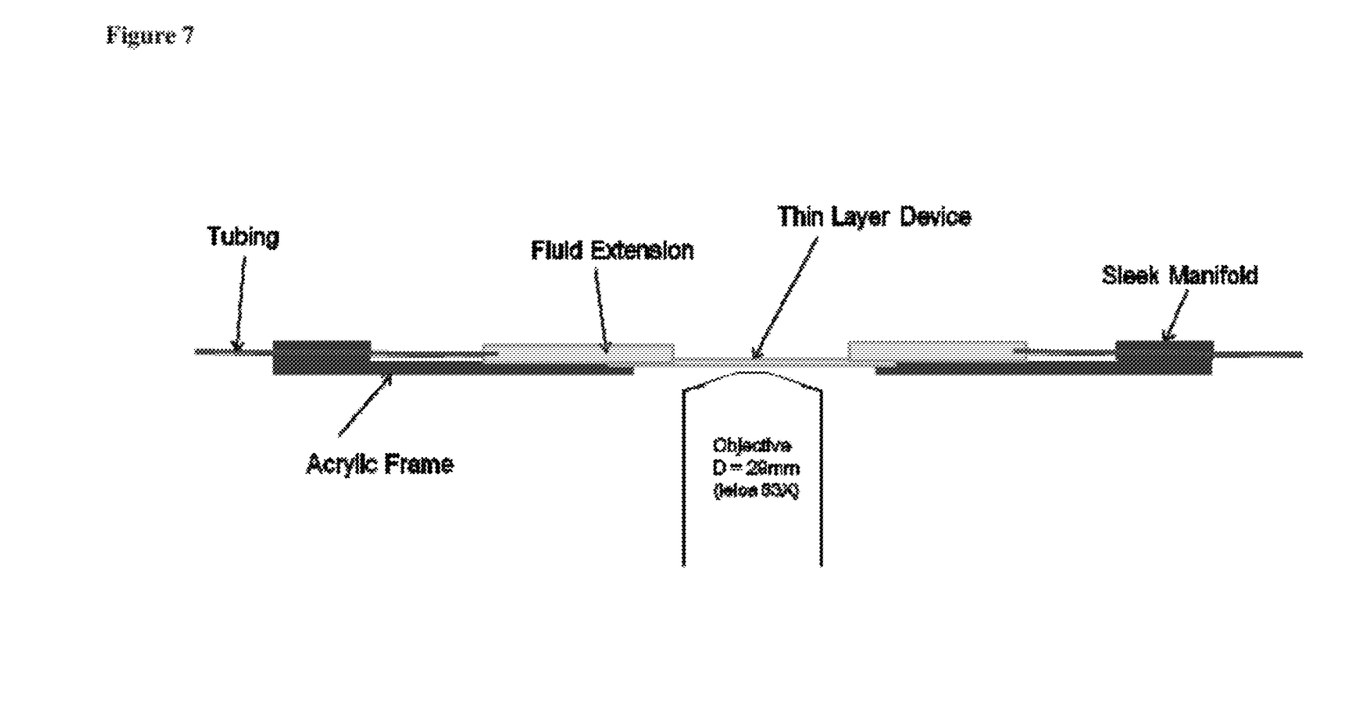
FIG. 7 is an illustration of a microfluidic device having low-profile manifolds and an acrylic frame.

One advantage of the features described above is that they permit the objective of a microscope to be located in close proximity to both the top and bottom surface of the microfluidic device. Another advantage of the features described above is that they allow an operator to utilize the entire field of view of the microscope when viewing cells located in the microfluidic device. FIG. 7 provides an illustration of a microfluidic device with low-profile manifolds.

The composition of the manifold may be selected in order to achieve certain performance properties. For example, in certain embodiments, the manifold (e.g., the first manifold structure and/or second manifold structure) are made from the same material as the first polymeric layer. In certain embodiments, the manifold (e.g., the first manifold structure and/or second manifold structure) is made of poly(dimethylsiloxane). The manifold should desirably be compatible with commercially available tubing used to deliver fluid to the microfluidic device.

When, for example, the manifold structure is made of poly(dimethylsiloxane), fluid ports may be created by applying a biopsy punch to the manifold structure in order to create a conduct that is fluidly connected to one or more chambers in the microfluidic device. Commercially available tubing may be attached to the fluid port so that fluid can be delivered to or from chambers in the microfluidic device via fluid ports in the manifold structure. One advantage of creating fluid ports in the manifold structure by applying a biopsy punch is that it alleviates certain alignment difficulties associated with systems described in the literature for connecting chambers in a microfluidic device with a fluid port.

IV. Fluid Conduits and Pumps

Microfluidic devices described herein may optionally contain one or more of: (i) an access conduit affording fluid communication with an input end of one or more chambers; (ii) a return conduit affording fluid communication with an output end of one or more chambers; and (iii) a first pump for ensuring that a fluid entering the access conduit flows through one or more chambers and out the return conduit.

Access and return conduits can convey fluid, such as nutrients for cells, to and from the chamber(s). The conduits can be standard medical tube materials including polymers such as silicone rubber, polyurethane, polyethylene, polyvinyl chloride, and latex rubber. An approximate size range of the inner diameter of the access conduits can be 300 µm-1 cm. The access conduits can be integrated into the microfluidic device, or can instead be separate and have attachment points to connect to the microfluidic device. A pump may regulate fluid flow rate into the device.

The conduits may be configured with a pump in order to achieve continuous flow of fluid through the microfluidic device. It is contemplated that a configuration providing continuous fluid flow through the microfluidic device may provide advantages when testing the effects of a test composition (e.g., a drug) on cells located in a chamber of the microfluidic device.

V. Reservoir for Fluid Storage

The microfluidic device may optionally comprise a reservoir for fluid storage. In certain embodiments, the reservoir is an extension of at least one chamber. In certain embodiments, the reservoir contains nutrients for cells.

VI. Methods for Transferring a Patterned, Thin Polymeric Layer

Another aspect of the invention provides a method of transferring a patterned, thin polymeric layer from a first substrate to a second substrate. The method comprises (a) providing a patterned, thin polymeric layer on a first substrate; (b) providing a transfer-assist substrate having a surface of polyimide polymer treated with oxygen plasma; (c) transferring the patterned, thin polymeric layer of the first substrate to the surface of polyimide polymer treated with oxygen plasma, to form a composite; (d) plasma treating at least the patterned, thin polymeric layer on the composite to form a plasma-treated composite; (e) exposing at least the patterned, thin polymeric layer of the plasma-treated composite to an aminoalkyltrialkoxysilane to form a pre-bond composite; and (f) transferring the patterned, thin polymeric layer of pre-bond composite to a second substrate. The method can be used to transfer a patterned, thin polymeric layer from a first substrate to a second substrate without causing any significant distortion to the patterned, thin polymeric layer.

In certain embodiments, the aminoalkyltrialkoxysilane is 3-aminopropyltriethoxysilane.

In certain embodiments, the patterned, thin polymeric layer is made of poly(dimethylsiloxane).

In certain embodiments, the patterned, thin polymeric layer has a thickness of less than 150 µm, 100 µm, or 50 µm.

VII. Preparation of Microfluidic Devices

Microfluidic devices described herein can be prepared by making the first polymeric layer and second polymeric layer having the desired thickness and number of chambers, and then assembling the various components of the microfluidic device in the desired orientation.

A polymeric layer containing one or more chambers can be prepared using microfabrication methods where a polymer is molded to a microfabricated mold. For example, poly(dimethylsiloxane) (PDMS) may spin-coated onto the mold. The mold may be created through microfabrication, typically photopatterned photoresist; however, etched silicon, cured epoxy, and/or electroformed metal can also be used. Prepolymer is then poured into the mold, and the mold is spun at a specific speed to create a thin layer of the prepolymer. The prepolymer is then cured, and the resulting polymeric layer released from the mold after curing.

If a polymeric layer containing one or more chambers that span completely through the polymeric layer is desired, such a polymeric layer can be prepared by applying a load over the spun prepolymer in a pressure chamber. The resulting polymeric layer containing one or more chambers that span completely through the polymeric layer can be transferred using the transfer technique described in Section VI.

Once the first polymeric layer has been prepared, the first polymeric layer is attached to the first transparent, solid support layer. Then, a semi-permeable membrane is attached to the surface of the first polymeric support layer opposite the first transparent, solid support layer. Next, the second polymeric layer is attached on top of the semi-permeable membrane. Then, any second transparent, solid support layer is attached on top of the second polymeric layer.

Polymeric layers containing chambers can be aligned using techniques that include visual alignment and/or alignment via mechanical locating devices. Visual alignment may be achieved by using alignment marks or fiducials integrated into the layers that serve to guide layer alignment for assembly. The alignment may involve magnifying the view of the device layers and any alignment marks, a mechanism to move the layers relative to each other very precisely, and a means of bonding the layers together either permanently or temporarily.

VIII. Methods of Viewing Cells in a Microfluidic Device

Microfluidic devices described herein can be used to view cells in an environment that mimic in vivo conditions.

Accordingly, one aspect of the invention provides a method of viewing cells. The method comprises: (a) providing a microfluidic device described herein containing at least one cell, (b) positioning a microscope to view cells attached to the semi-permeable membrane, and (c) viewing said cells with said microscope.

In another aspect, the invention provides a method of viewing cells that comprises:
(a) providing a microfluidic device comprising:
  i. a first, transparent, polymeric layer that has a thickness of from about 75 µm to about 350 µm, and defines therein at least one chamber;
  ii. a semi-permeable membrane attached to the first, transparent polymeric layer;
  iii. a second, transparent, polymeric layer attached to the opposite side of the semi-permeable membrane from the first transparent polymeric layer; wherein the second, transparent, polymeric layer defines therein at least one chamber that is positioned to overlap, at least partially, with at least one chamber in the first, transparent, polymeric layer; and
  iv. at least one cell attached to a surface of the semi-permeable membrane in a chamber in the first, transparent polymeric layer or a surface of the semi-permeable membrane in a chamber in the second, transparent polymeric layer;
(b) positioning a microscope to view said cell; and
(c) viewing said cell with the microscope.

In certain embodiments, the first, transparent, polymeric layer has a thickness of from about 150 µm to about 300 µm, or about 200 µm to about 300 µm. In certain embodiments, the second, transparent, polymeric layer has a thickness of from 75 µm to about 350 µm, about 150 µm to about 300 µm, or about 200 µm to about 300 µm. In certain embodiments, the first, transparent, polymeric layer and/or the second, transparent, polymeric layer are made from poly(dimethylsiloxane). In certain embodiments, any chamber in the first, transparent, polymeric layer and/or the second, transparent, polymeric layer have a width in the range of about 1 µm to about 1 cm, from about 50 µm to about 700 µm, about 50 µm to about 500 µm, about 50 µm to about 400 µm, about 100 µm to about 500 µm, about 200 µm to about 400 µm, or about 250 µm to about 350 µm. The semi-permeable membrane may be made of polycarbonate or one of the materials described in Section I above for the semi-permeable membrane.

The microfluidic devices and methods of viewing cells are contemplated to be compatible with various types of microscopes for viewing cells, such as microscopes suited for oil emersion objective use, microscopes equipped with a non-contact objective lens, microscopes equipped with a water immersion objective lens, an inverted microscope, confocal microscope, up-right microscope, total internal reflectance (TIR or TIRF) microscope, compound microscope, or dissecting stereoscope. Further for example, microfluidic devices and methods of viewing cells are contemplated to be compatible with microscopes capable of visualizing objects having a size as small as 500 nm, and/or microscopes that provide up to or greater than 60x magnification. To help visualize cellular components and metabolizing agents, cellular fluorescing stains may be used Exemplary agents such as F-actin stain, Hoechst 33342, Calcein AM and Ethidium Homodimer-1 stain may be used.

IX. Definitions

To facilitate an understanding of the present invention, a number of terms and phrases are defined below.

The terms "a," "an" and "the" as used herein mean "one or more" and include the plural unless the context is inappropriate.

The term "alkyl" is art-recognized, and includes saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 30 or fewer carbon atoms in its backbone (e.g., $C_1$-$C_{30}$ for straight chain, $C_3$-$C_{30}$ for branched chain), and alternatively, about 20 or fewer. Likewise, cycloalkyls have from about 3 to about 10 carbon atoms in their ring structure, and alternatively about 5, 6 or 7 carbons in the ring structure. Exemplary alkyl groups include methyl, ethyl, n-propyl, isopropyl, n-butyl, sec-butyl, isobutyl, tert-butyl, cyclopropyl, and cyclobutyl.

The terms "alkoxyl" or "alkoxy" are art-recognized and refer to an alkyl group, as defined above, having an oxygen radical attached thereto. Representative alkoxyl groups include methoxy, ethoxy, propyloxy, tert-butoxy and the like.

The term "transparent" refers to ability to transmit visible light.

The term "patterned, thin polymeric layer" refers to a patterned polymeric layer having a thickness of less than about 200 µm.

The term "cyclic olefin copolymer" is art-recognized and refers to a copolymer made by polymerization of ethylene and a cyclic olefin. Exemplary cyclic olefin copolymers include "ethylene-norbornene copolymer" and "ethylene-tetracyclododecene copolymer."

Throughout the description, where devices are described as having, including, or comprising specific components, or where processes and methods are described as having, including, or comprising specific steps, it is contemplated that, additionally, there are devices of the present invention that consist essentially of, or consist of, the recited components, and that there are processes and methods according to the present invention that consist essentially of, or consist of, the recited processing steps.

Also, as a general matter, if a variable is not accompanied by a definition, then the previous definition of the variable controls.

EXAMPLES

The invention now being generally described, will be more readily understood by reference to the following example, which is included merely for purposes of illustration of certain aspects and embodiments of the present invention, and are not intended to limit the invention.

Example 1

Figure 1:
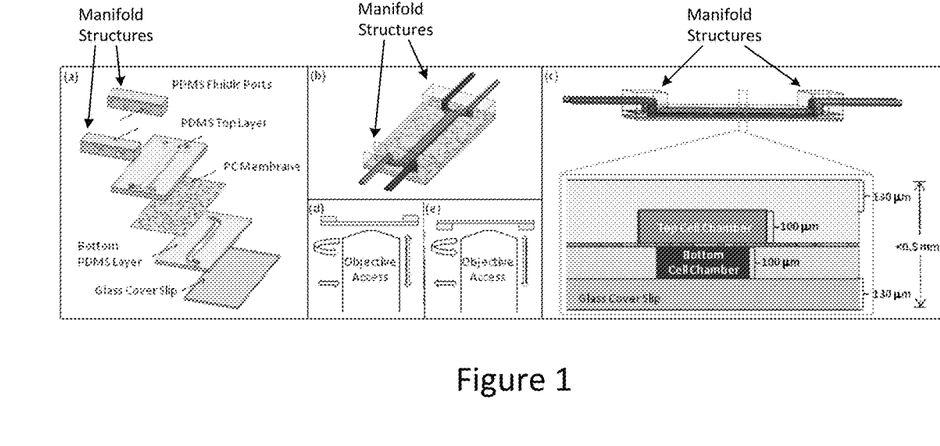
FIG. 1 illustrates aspects of an exemplary microfluidic device that can be used for viewing cells. Part A illustrates components of an exemplary microfluidic device. Part B illustrates flow chambers in an exemplary microfluidic device. Part C provides an expanded cross-sectional view of an exemplary microfluidic device. Parts D and E illustrate that an objective of a microscope can be placed in proximity to either the top or bottom surface of the microfluidic device for viewing cells.

General: Design criteria for the microfluidic device included 1) access by oil emersion objective lens imaging, 2) optimal gas exchange, and 3) ease of selective cell seeding on both sides of the membrane. Thinness, material choice, and incorporation of a perforated monolithic membrane were some of the factors addressed to meet the aforementioned device design criteria. The device consisted of 4 layers: a glass cover slip at the bottom, an intermediate PDMS layer, a polycarbonate (PC) membrane, and PDMS layer on top as shown in (FIG. 1a). PDMS was chosen for its biocompatibility, optical clarity and ease of fabrication. The cover slip on the bottom provided mechanical stability and allowed for use of a microscope, while the thin intermediate and top PDMS layers facilitated higher gas exchange (FIG. 1a-c).

A track-etched PC membrane (10 µm thick, 10 µm pores) was incorporated into the device. Lastly, a microscope frame adapter was designed for holding the chip. The combination of fluidic port design and frame allowed for imaging access to live cell culture on both sides of the membrane. In addition to selecting suitable materials for the device fabrication and cell culture, the design criteria focused on compatibility with a microscope. Because the working distance of an oil immersion 100X objective is <~300 µm, and a No. 1 glass coverslip accounted for 130 µm of that distance, the device was designed with a 100 µm thick PDMS gasket between the coverslip and the bottom side of the membrane (FIG. 1c). This ensures that the membrane is within the working distance of the objective. On top of the device, instead of a glass coverslip, PDMS of the same 130 mm thickness was used. The distance from the top PDMS layer to the top side of the membrane was also 100 µm (FIG. 1c). The device was designed with a length of 50 mm and low-profile fluidic ports to accommodate the lateral movement of microscope objectives (FIG. 1d-e). Lastly, the channel layout was designed with two independent devices on a glass cover slip to demonstrate the option for multiplexing.

Figure 2:
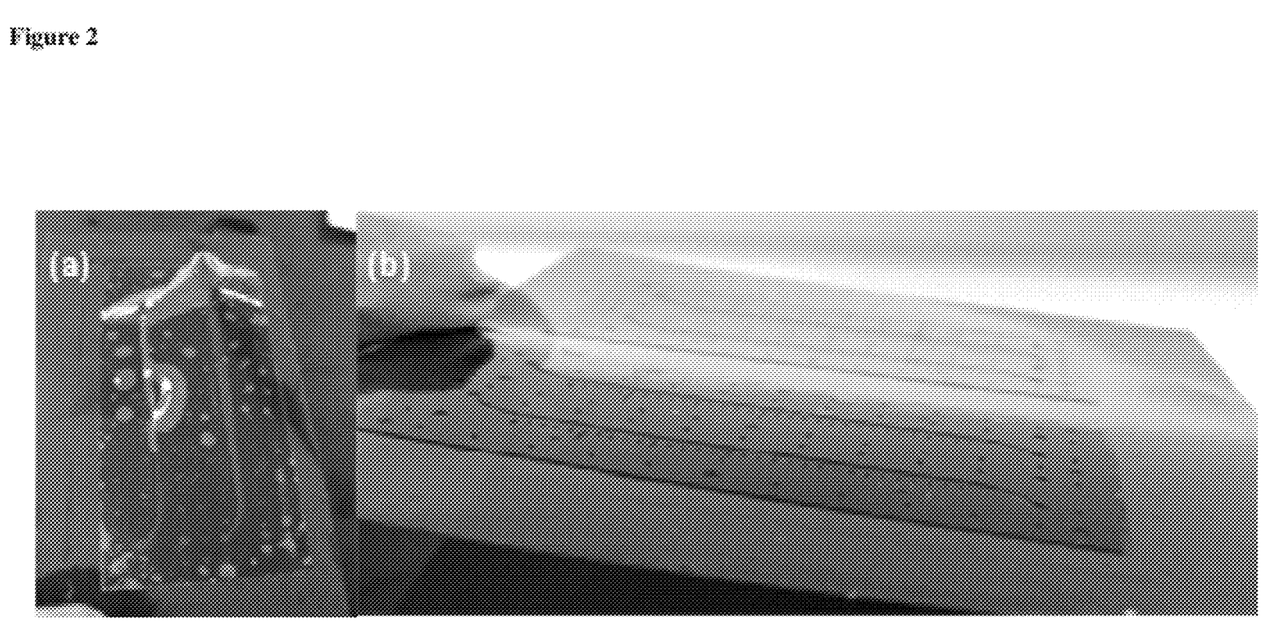
FIG. 2 illustrates a thin layer of poly(dimethylsiloxane) (PDMS). Part A illustrates that a thin layer of PDMS in isolation (e.g., having a thickness less than 100 µm) can be prone to wrinkling when present in certain dimensions. Part B illustrates that a thin layer of PDMS can be transferred without any significant distortion according to a substrate transfer technique of the invention that uses a surface of polyimide polymer.

Because a thin (e.g., <100 µm) layer of PDMS can be prone to wrinkling and can be difficult to handle (FIG. 2a), a new transfer technique was develop in order to transfer a thin PDMS layer from a wafer to a Kapton™ film without causing any undue distortion (FIG. 2b). Kapton™ (a polyimide film produced by DuPont Electronics) was used for substrate transfer which allowed for a clear interface distinction between the carrier material and patterned PDMS, as opposed to using PDMS as the carrier material reported by Zhang et al. in *Lab Chip,* 2010, 10, 548. In addition, as a high temperature thermoplastic, Kapton™ can withstand high mechanical loads useful for creating punched through patterned PDMS molds. In sum, Kapton™ provided transparency and flexibility for feature alignment, and the endurance to high temperatures and pressures of molding, thus allowing easy transfer of PDMS for a layer by layer assembly.

Following substrate transfer, the PC membrane was sandwiched between the top layer and the intermediate PDMS layers using wet silane (3-aminopropyltriethoxysilane-APTES) chemistry with modifications described by Yung et al. in *Lab Chip,* 2009, 9, 1171. We were able to bond untreated PC membranes to PDMS that received APTES treatment after oxygen plasma. In addition, the bonding protocol was modified from a single temperature cure to incremental heating steps to reduce bonding defects such as bubbles in the membrane and PDMS interface.

Figure 3:
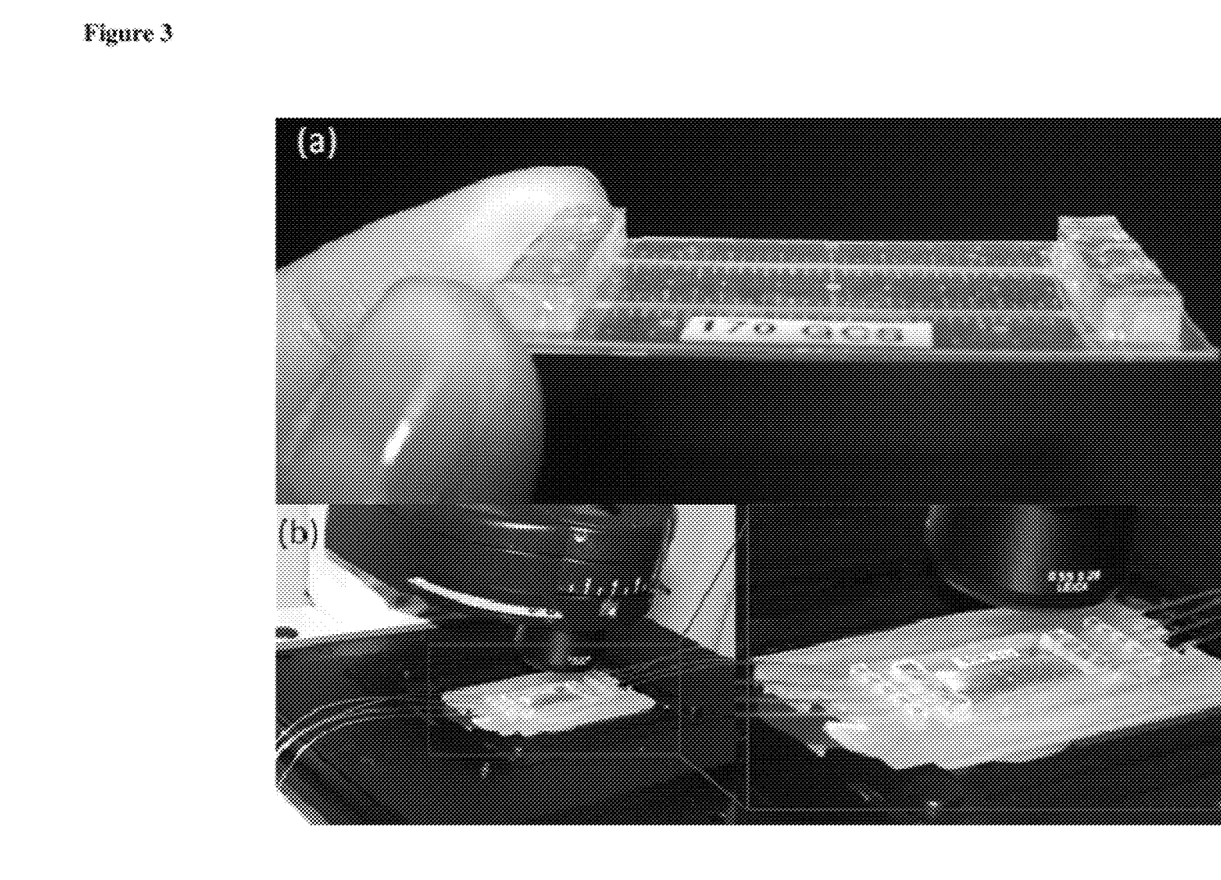
FIG. 3 depicts an exemplary microfluidic device of the invention. Part A is a close-up view of an exemplary microfluidic device of the invention. Part B illustrates a microfluidic device in a custom-built frame with tubing connected to fluid ports of the microfluidic device, and use of the microfluidic device with a microscope.
Figure 4:
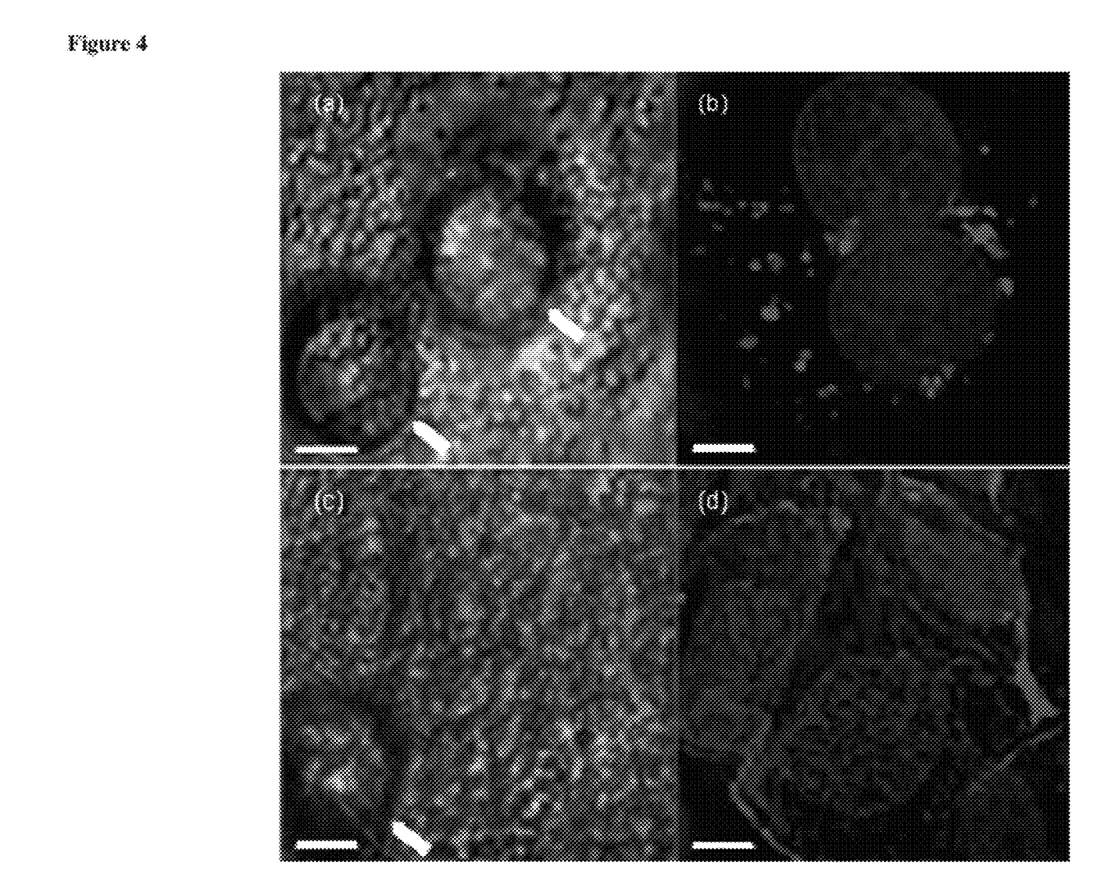
FIG. 4 depicts images of cells taken with a microscope, where the cells were positioned in a microfluidic device of the invention. Part A is an image of primary hepatocytes in a top channel observed through a PDMS layer and identifies mitochondria and nuclei. Part B is fluorescent-only image of Part A. Part C is an image of HepG2 hepatocytes in a bottom channel observed through a cover glass identifying actin fibers and nuclei. Part D is a fluorescence-only image of Part C. Arrows in the images show 10 µm diameter pores in the semi-permeable membrane. Scale bars represent 5 µm.

FIG. 3 shows a successfully fabricated membrane suspended microfluidic device suitable for use with a microscope. FIG. 4 provides exemplary images of cells within the device, demonstrating that images can be taken by viewing from either side of the membrane. The subcellular nucleus chromatin structure, individual mitochondria and actin filament structure of stained hepatocytes were captured live, while the device was under perfusion using vital stains.

Preparation of Microfluidic Device: The device was composed of a glass cover slip (No. 1), a polycarbonate membrane (PC) (GE Osmonics), PDMS (Dow Sylgard 184) chamber layers molded from custom-patterned SU-8 (Microchem Co.) silicon wafers and poly(dimethylsiloxane) (PDMS) fluidic ports. The wafers were vapor deposited with (tridecafluoro-1,1,2,2-tetrahydrooctyl) trichlorosilane (Gelest Inc) for ease of PDMS removal. A SU-8 wafer was used to pattern the top PDMS layer (FIG. 1d) by spinning two layers of uncured PDMS (10:1 polymer base to curing agent) to a final thickness of 230 µm at 650 rpm for 60 seconds. The intermediate PDMS layer (FIG. 1d) with through-hole features was fabricated by curing PDMS using a previously described custom lamination chamber at 40 psi at 65° C. for 25 min. See, for example, Yung et al. in *Lab on Chip,* 2009, 9, 1171. Fluidic ports were punched in a PDMS block with a 1.5 mm biopsy punch.

To transfer the intermediate PDMS layer from the patterned wafer, Kapton™ was oxygen plasma treated (Harrick, 'model', 300 mTorr, 2 min, 30 W) before placing on top of the uncured PDMS in the lamination chamber. The laminated PDMS layer, still on the Kapton™ substrate, was plasma treated (300 mTor, 2 min, 30 W) and then soaked in a APTES/DI water solution (5% v/v) for 20 min at 80° C. (APTES refers to 3-aminopropyltriethoxysilane) This APTES-treated PDMS layer was then bonded to an untreated PC membrane by heating at 37° C. for 5 min. The same APTES solvent treatment was used to bond the aligned PDMS top layer to the exposed PC surface of the stack (FIG. 1a). This bond was cured at room temperature for 1-3 h followed by 3-8 h at 37° C. and 1-3 h at 65° C. The Kapton™ was released from the laminated PDMS layer by the spraying isopropanol at the interface of Kapton™ and laminated PDMS. A No. 1 glass cover slip and low profile fluidic ports (1.5 mm diameter biopsy punched) were bonded to the laminated PDMS layer surface of the stack via described plasma treatment.

Imaging of Live Cells: The above microfluidic device was seeded with HepG2 hepatocyte cells. Then, the HepG2 hepatocyte cells were stained and visualized with a Deltavision microscope equipped with a oil immersion objective lens. Images of stained HepG2 hepatocyte cells obtained using this procedure are shown in FIG. 4. Images shown in Parts A and B of FIG. 4 are from cells stained with Hoecsht stain and Mitotracker stain. Images shown in Parts C and D of FIG. 4 are from cells stained with Hoecsht stain and F-actin.

Incorporation by Reference

The entire disclosure of each of the patent documents and scientific articles referred to herein is incorporated by reference for all purposes.

Equivalents

The invention may be embodied in other specific forms without departing from the spirit or essential characteristics thereof. The foregoing embodiments are therefore to be considered in all respects illustrative rather than limiting the invention described herein. Scope of the invention is thus indicated by the appended claims rather than by the foregoing description, and all changes that come within the meaning and range of equivalency of the claims are intended to be embraced therein.

We claim:

1. A microfluidic device comprising:
   (a) a first transparent, solid support layer comprising a first optically clear material;
   (b) a first polymeric layer comprising a second material different from the first material of the first transparent, solid support layer, wherein the first polymeric layer has a thickness of less than 200 μm, defines therein at least two chambers including a first chamber, and is attached to said first transparent, solid support layer;
   (c) a semi-permeable membrane attached to the first polymeric layer, wherein at least a portion of a surface of the semi-permeable membrane is plasma treated;
   (d) a second polymeric layer attached to the opposite side of the semi-permeable membrane from the first polymeric layer; wherein the second polymeric layer has a thickness of less than 300 μm, and defines therein at least two chambers including a second chamber that is positioned to overlap, at least partially, with at least the first chamber in the first polymeric layer, and wherein a cell culture is adhered to a surface of the semi-permeable membrane;
   (e) a first manifold structure attached to an input end of at least one of the first and second chambers;
   (f) a second manifold structure attached to an output end of at least one of the first and second chambers, wherein the first manifold structure and the second manifold structure are separated by a distance greater than about 20 millimeters; and
   (g) a solid frame, wherein the first transparent, solid support layer, the first polymeric layer, the semi-permeable membrane, and the second polymeric layer are positioned within the solid frame such that the solid frame surrounds the edges of the microfluidic device, thereby leaving an upper surface and a lower surface of the microfluidic device clear for viewing using a microscope;
   wherein a thickness of the second polymeric layer is selected to provide a predetermined level of oxygen gas permeance, structural rigidity, and an ability to observe the cell culture using a microscope positioned over the second polymeric layer and in alignment with at least one of the at least two chambers of the second polymeric layer.

2. The device of claim 1, wherein the first transparent, solid support layer has a thickness in the range about 100 μm to about 170 μm.

3. The device of claim 1, wherein the first transparent, solid support layer is made of glass, polyester, polycarbonate, polystyrene, poly(dimethylsiloxane), poly(methyl methacrylate), polyethylene, polyethylene terephthalate, polyurethane, polycaprolactone, polylactic acid, polyglycolic acid, poly(lactic-co-glycolic acid), polyglycerol sebacate, polyester amide, polydioxanone, cyclic olefin copolymer, quartz, or a transparent thermoplastic.

4. The device of claim 1, wherein the first transparent, solid support layer is made of glass.

5. The device of claim 1, wherein the first polymeric layer has a thickness in the range about 10 μm to about 130 μm.

6. The device of claim 1, wherein the first polymeric layer is made of poly(dimethylsiloxane), polycarbonate, polystyrene, poly(methyl methacrylate), polyethylene, polyethylene terephthalate, polyurethane, polycaprolactone, polylactic acid, polyglycolic acid, poly(lactic-co-glycolic acid), polyglycerol sebacate, polyester amide, polydioxanone, cyclic olefin copolymer, polyimide, or polyamide.

7. The device of claim 1, wherein the first polymeric layer is made of poly(dimethylsiloxane).

8. The device of claim 1, wherein the semi-permeable membrane has a thickness of about 1 μm to about 20 μm.

9. The device of claim 1, wherein the semi-permeable membrane is made of polycarbonate, poly(dimethylsiloxane), polyethersulfone, polysulfone, polystyrene, or polyester.

10. The device of claim 1, wherein the semi-permeable membrane is made of polycarbonate.

11. The device of claim 1, wherein the second polymeric layer has a thickness in the range about 150 μm to about 250 μm.

12. The device of claim 1, wherein the second polymeric layer is made of poly(dimethylsiloxane), polycarbonate, polystyrene, poly(methyl methacrylate), polyethylene, polyethylene terephthalate, polyurethane, polycaprolactone, polylactic acid, polyglycolic acid, poly(lactic-co-glycolic acid), polyglycerol sebacate, polyester amide, polydioxanone, cyclic olefin copolymer, polyimide, or polyamide.

13. The device of claim 1, wherein the second polymeric layer is made of poly(dimethylsiloxane).

14. The device of claim 1, wherein any of the at least two chambers in the first polymeric layer has a height spanning from the first transparent, solid support layer to the semi-permeable membrane.

15. The device of claim 1, wherein any of the at least two chambers in the first polymeric layer has a width in the range of from about 10 μm to about 1 cm.

16. The device of claim 1, wherein any of the at least two chambers in the first polymeric layer has a width in the range of from about 100 μm to about 500 μm.

17. The device of claim 1, wherein any of the at least two chambers in the second polymeric layer has a width in the range of from about 10 μm to about 1 cm.

18. The device of claim 1, wherein any of the at least two chambers in the second polymeric layer has a width in the range of from about 100 μm to about 500 μm.

19. The device of claim 1, wherein any of the at least two chambers in the second polymeric layer has a height in the range of from about 10 μm to about 150 μm.

20. The device of claim 1, further comprising a second transparent, solid support layer attached to an opposite side of the second polymeric layer from the semi-permeable membrane.

21. The device of claim 20, wherein the second transparent, solid support layer is made of glass, polyester, polycarbonate, polystyrene, poly(dimethylsiloxane), poly(methyl methacrylate), polyethylene, polyethylene terephthalate, polyurethane, polycaprolactone, polylactic acid, polyglycolic acid, poly(lactic-co-glycolic acid), polyglycerol sebacate, polyester amide, polydioxanone, cyclic olefin copolymer, quartz, or a transparent thermoplastic.

22. A method of viewing cells, comprising:
(a) providing a microfluidic device of claim 1;
(b) positioning a microscope to view cells attached to the semi-permeable membrane; and
(c) viewing said cells with said microscope.

23. The microfluidic device of claim 1, wherein a surface of at least one of the first chamber and the second chamber comprises a three-dimensional structure to induce fluid mixing.

24. The microfluidic device of claim 1, wherein at least one of the first chamber and the second chamber has a rounded cross sectional geometry selected to reduce shear stress experienced by a fluid traveling through the at least one of the first chamber and the second chamber.

25. The microfluidic device of claim 1, wherein a surface of at least one of the first chamber and the second chamber is modified with at least one of a hydrophobic agent, a hydrophilic agent, a collagen, and an antibody.

26. The microfluidic device of claim 1, further comprising a reservoir for fluid storage, the reservoir containing nutrients for the cell culture, wherein the reservoir comprises an extension of at least one of the first chamber and the second chamber.

27. The microfluidic device of claim 1, wherein a height and a shape of the first manifold structure and the second manifold structure are selected to permit an objective lens of the microscope to come into close proximity to a surface of the microfluidic device proximate to the second polymeric layer.

28. The microfluidic device of claim 27, wherein the height and the shape of the first manifold structure and the second manifold structure are further selected to permit a second objective lens of a second microscope to come into close proximity to a second surface of the microfluidic device proximate to the first transparent, solid support layer.

29. A microfluidic device comprising:
(a) a first transparent, solid support layer comprising a first optically clear material;
(b) a first polymeric layer comprising a second material different from the first material of the first transparent, solid support layer, wherein the first polymeric layer has a thickness of less than 200 μm, defines therein at least two chambers including a first chamber, and is attached to said first transparent, solid support layer;
(c) a semi-permeable membrane attached to the first polymeric layer, wherein at least a portion of a surface of the semi-permeable membrane is plasma treated;
(d) a second polymeric layer attached to the opposite side of the semi-permeable membrane from the first polymeric layer; wherein the second polymeric layer has a thickness of less than 300 μm, and defines therein at least two chambers including a second chamber that is positioned to overlap, at least partially, with at least the first chamber in the first polymeric layer, and wherein a cell culture is adhered to a surface of the semi-permeable membrane, and wherein a surface of at least one of the first chamber and the second chamber comprises a three-dimensional structure to induce fluid mixing;

(e) a first manifold structure attached to an input end of at least one of the first and second chambers;

(f) a second manifold structure attached to an output end of at least one of the first and second chambers, wherein the first manifold structure and the second manifold structure are separated by a distance greater than about 20 millimeters; and (g) a solid frame, wherein the first transparent, solid support layer, the first polymeric layer, the semi-permeable membrane, and the second polymeric layer are positioned within the solid frame such that the solid frame surrounds the edges of the microfluidic device, thereby leaving an upper surface and a lower surface of the microfluidic device clear for viewing using a microscope;

(h) a reservoir for fluid storage, the reservoir containing nutrients for the cell culture, wherein the reservoir comprises an extension of at least one of the first chamber and the second chamber;

wherein:
a thickness of the second polymeric layer is selected to provide a predetermined level of oxygen gas permeance, structural rigidity, and an ability to observe the cell culture using a microscope positioned over the second polymeric layer and in alignment with at least one of the at least two chambers of the second polymeric layer;

a height and a shape of the first manifold structure and the second manifold structure are selected to permit an objective lens of the microscope to come into close proximity to a surface of the microfluidic device proximate to the second polymeric layer and to permit a second objective lens of a second microscope to come into close proximity to a second surface of the microfluidic device proximate to the first transparent, solid support layer;

at least one of the first chamber and the second chamber has a rounded cross sectional geometry selected to reduce shear stress experienced by a fluid traveling through the at least one of the first chamber and the second chamber; and a surface of at least one of the first chamber and the second chamber is modified with at least one of a hydrophobic agent, a hydrophilic agent, a collagen, and an antibody.

* * * * *